US009550114B2

United States Patent
Hohn

(10) Patent No.: US 9,550,114 B2
(45) Date of Patent: Jan. 24, 2017

(54) GPS THEATER SYSTEM

(71) Applicant: Robert Andrew Hohn, Sarver, PA (US)

(72) Inventor: Robert Andrew Hohn, Sarver, PA (US)

( * ) Notice: Subject to any disclaimer, the term of this patent is extended or adjusted under 35 U.S.C. 154(b) by 268 days.

(21) Appl. No.: 14/475,115

(22) Filed: Sep. 2, 2014

(65) Prior Publication Data

US 2015/0065237 A1    Mar. 5, 2015

Related U.S. Application Data

(60) Provisional application No. 61/872,931, filed on Sep. 3, 2013.

(51) Int. Cl.
| | |
|---|---|
| G06F 17/00 | (2006.01) |
| A63F 13/216 | (2014.01) |
| A63F 13/69 | (2014.01) |
| H04W 4/04 | (2009.01) |
| H04W 4/02 | (2009.01) |

(52) U.S. Cl.
CPC ............ A63F 13/216 (2014.09); A63F 13/69 (2014.09); H04W 4/046 (2013.01); H04W 4/028 (2013.01)

(58) Field of Classification Search
USPC .... 463/29–32; 340/995.17, 995.24; 701/411, 701/430
See application file for complete search history.

(56) References Cited

U.S. PATENT DOCUMENTS

| | | | |
|---|---|---|---|
| 6,360,167 B1* | 3/2002 | Millington | G07C 5/008 342/357.31 |
| 7,741,978 B2* | 6/2010 | Becker | G01C 21/20 340/539.13 |
| 8,279,090 B2* | 10/2012 | Becker | G01C 21/20 340/539.13 |
| 8,600,667 B2* | 12/2013 | Ranford | G01C 21/26 701/439 |
| 8,930,162 B2* | 1/2015 | Wang | H04W 4/02 702/150 |
| 8,965,410 B2* | 2/2015 | Clark | H04W 4/02 455/414.1 |
| 2002/0142759 A1* | 10/2002 | Newell | A63F 13/12 455/414.1 |
| 2008/0059222 A1 | 3/2008 | Zhang | |
| 2012/0108265 A1 | 5/2012 | Morin | |

FOREIGN PATENT DOCUMENTS

| | | |
|---|---|---|
| AU | 668847 B | 5/1996 |
| WO | 2012122441 A2 | 9/2012 |

* cited by examiner

*Primary Examiner* — Ronald Laneau
(74) *Attorney, Agent, or Firm* — The Law Firm of Andrea Hence Evans, LLC

(57) ABSTRACT

The invention features methods, systems and computer program product for the provision of entertainment content and storytelling of a customized story based on trigger points in a GPS system. The trigger points can be predetermined or conditional. The invention provides an interactive entertainment method that features an ongoing story that will be told based on the trigger points. Stories are tailored and customized to incorporate points of interest along a travel route.

36 Claims, 5 Drawing Sheets

GPS THEATER SYSTEM

CROSS-REFERENCE TO RELATED APPLICATIONS

This application claims the benefit of, and is related to Applicant's provisional patent application U.S. Provisional Patent Application No. 61/872,931 titled "GPS THEATER SYSTEM," filed Sep. 3, 2013, which is incorporated herein in its entirety.

FIELD OF THE INVENTION

The present invention relates, in general, to a system and method of entertainment and storytelling having customized content based on trigger points identified in a GPS system.

BACKGROUND OF THE INVENTION

Global Positioning System (GPS) devices are devices which can track the location of a given vehicle and provide correct directions to a given destination. The GPS provides step by step directions on how to get to the given destination. Many GPS systems are built into vehicles or a GPS system can be downloaded onto a portable electronic device such as a phone or computer, for example. Whether a traveler is traveling near or far, a GPS is often used and they are extremely useful.

Long road trips can be a trying experience for travelers. Passengers are typically entertained by the scenery. They also read books and magazines to pass time. Electronic devices such as phones, CD players, DVD players also entertain travelers on road trips. These forms of entertainment do not afford the travelers the ability to interact and bond with each other while learning about their surroundings.

SUMMARY OF THE INVENTION

The present invention provides a method and system of customized entertainment and/or entertainment content incorporating trigger points established by a GPS system. The present invention also features computer program product for providing customized entertainment and/or entertainment content incorporating trigger points established by a GPS system.

An aspect of an embodiment of the invention features regular or customized entertainment content which may be provided, in one aspect of an embodiment of the present invention, in the form of storytelling which may feature and/or incorporate alternative content based on variables such as vehicle speed, frequency of vehicle stops, date and time, for example.

A further aspect of an embodiment of the invention features trigger points being pre-determined and conditional based on GPS coordinates, user inputted data, device data or logic and deductive reasoning.

A further aspect of an embodiment of the invention features stories that are tailored and customized to incorporate points of interest such as city names, geography, landmarks, and exit numbers, for example as the user passes by or is in the vicinity.

A further aspect of an embodiment of the invention features the system providing visual capabilities, auditory capabilities and holographic images.

In one aspect of an embodiment of the present invention, the invention contemplates a method for generating GPS-enabled entertainment using a computer processor, the method including, without limitation, the steps of determining a user's GPS location (where the user is travelling in a vehicle); loading one or more story paths having one or more pre-determined trigger points, where each of the one or more predetermined trigger points are embedded within the one or more story paths and where each of the one or more predetermined trigger points is set up to trigger play of one or more entertainment content while the vehicle travels along the story path; comparing the user's GPS location with the one or more story paths; providing the user with the one or more entertainment content based on the one or more pre-determined trigger points; and providing interactive activity or effects consistent with the one or more story paths, the one or more entertainment content and one or more current travel condition of the user's vehicle.

In an aspect of an embodiment of the present invention, the method may include the step of using conditional, deductive and logic statements to determine conditional content to play within the one or more story paths.

In an aspect of an embodiment of the present invention, the method may include, the steps of determining whether the one or more entertainment content had been played before and providing different conditional content if the one or more entertainment content had been played before.

In an aspect of an embodiment of the present invention, the method may include, the step of determining whether or not to continue playing the one or more entertainment content where the user is no longer on the one or more story paths.

In an aspect of an embodiment of the present invention, the method may include the step of playing conditional content based on the user's real-time conditions.

In an aspect of an embodiment of the present invention, the method may include the step of adding new content to the one or more story paths.

In an aspect of an embodiment of the present invention, the method may include the step of setting play conditions within the one or more story paths for playing the new content.

In an aspect of an embodiment of the present invention, the method may include the step of changing the one or more entertainment content when the vehicle stops.

In an aspect of an embodiment of the present invention, the provision of interactive activity or effects may be as a result of one or more trigger.

In another aspect of an embodiment of the present invention, the provision of interactive activity or effects may be based upon user input.

In another aspect of an embodiment of the present invention, the method may include the step of performing deductive reasoning, calculations and executing logic formulae to determine whether entertainment content should be triggered.

In another aspect of an embodiment of the present invention, the method may include the step of synchronizing the provision of the one or more entertainment content with the user's movement or location.

In another aspect of an embodiment of the present invention, the method may include the step of detecting gaps in the one or more story paths during the provision of the one or more entertainment content.

In another aspect of an embodiment of the present invention, the method may include the step of providing filler or conditional content where a gap has been detected.

In another aspect of an embodiment of the present invention, the method may include the step of adjusting the timing of play of the one or more entertainment content to provide seamless play while maintaining synchronization.

In another aspect of an embodiment of the present invention, the method may include the steps of prioritizing the one or more predetermined trigger points and maintaining story synchronization.

In another aspect of an embodiment of the present invention, the method may include the step of calculating whether synchronization is maintained as a result of play of the one or more entertainment content based on the one or more trigger point.

In another aspect of an embodiment of the present invention, the method may include the step of prioritizing the one or more trigger point to determine which the one or more trigger point are to be triggered to ensure that critical elements of the one or more entertainment content are played while maintaining synchronization with the user's travel route.

In yet another aspect of an embodiment of the present invention, the invention contemplates computer program product including a computer usable medium having control logic stored on it for causing a computer processor to generate GPS-enabled entertainment, where the control logic includes computer readable program code for: determining a user's GPS location (where the user is travelling in a vehicle), loading one or more story paths having one or more pre-determined trigger points, where each of the one or more predetermined trigger points being embedded within the one or more story paths and where each of the one or more predetermined trigger points is set up to trigger play of one or more entertainment content while the vehicle travels along the story path, comparing the user's GPS location with the one or more story paths, providing the user with the one or more entertainment content based on the one or more pre-determined trigger point and providing interactive activity or effects consistent with the one or more story paths, the one or more entertainment content and one or more current travel condition of the user's vehicle.

In yet another aspect of an embodiment of the present invention, the control logic may include computer readable program code for determining conditional content to play within the one or more story paths using conditional, deductive and logic statements.

In yet another aspect of an embodiment of the present invention, the control logic may include computer readable program code for determining whether the one or more entertainment content had been played before and providing different conditional content if the one or more entertainment content had been played before.

In yet another aspect of an embodiment of the present invention, the control logic may include computer readable program code for determining whether or not to continue playing the one or more entertainment content where the user is no longer on the one or more story paths.

In yet another aspect of an embodiment of the present invention, the control logic may include computer readable program code for playing conditional content based on the user's real-time conditions.

In yet another aspect of an embodiment of the present invention, the control logic may include computer readable program code for enabling addition of new content to the one or more story paths In yet another aspect of an embodiment of the present invention, the control logic may include computer readable program code for setting play conditions within the one or more story paths for playing the new content.

In yet another aspect of an embodiment of the present invention, the control logic may include computer readable program code for providing interactive activity or effects consistent with the one or more story paths, entertainment content and one or more current travel condition of the user.

In yet another aspect of an embodiment of the present invention, the execution of the computer readable program code for providing interactive activity or effects may be based on the one or more predetermined trigger points.

In yet another aspect of an embodiment of the present invention, the execution of the computer readable program code for providing interactive activity or effects may be based on user input.

In a further aspect of an embodiment of the present invention, the control logic may include computer readable program code for performing deductive reasoning, calculations and executing logic formulae to determine whether entertainment content should be triggered.

In a further aspect of an embodiment of the present invention, the control logic may include computer readable program code for synchronizing the provision of the one or more entertainment content with the user's movement or location.

In a further aspect of an embodiment of the present invention, the control logic may include computer readable program code for detecting gaps in the one or more story paths during the provision of the one or more entertainment content.

In a further aspect of an embodiment of the present invention, the control logic may include computer readable program code for providing filler or conditional content where a gap has been detected.

In a further aspect of an embodiment of the present invention, the control logic may include computer readable program code for adjusting the timing of play of the one or more entertainment content to provide seamless play while maintaining synchronization.

In a further aspect of an embodiment of the present invention, the control logic may include computer readable program code for prioritizing the one or more predetermined trigger points and maintaining story synchronization.

In a further aspect of an embodiment of the present invention, the control logic may include computer readable program code for calculating whether synchronization is maintained as a result of play of the one or more entertainment content based on the one or more trigger point.

In a further aspect of an embodiment of the present invention, the control logic may include computer readable program code for prioritizing the one or more trigger point to determine which the one or more trigger point are to be triggered to ensure that critical elements of the one or more entertainment content are played while maintaining synchronization with the user's travel route.

Additional aspects, objectives, features and advantages of the present invention will become apparent from the following description of the preferred embodiments with reference to the attached drawings.

DETAILED DESCRIPTION OF THE INVENTION

Figure 1:
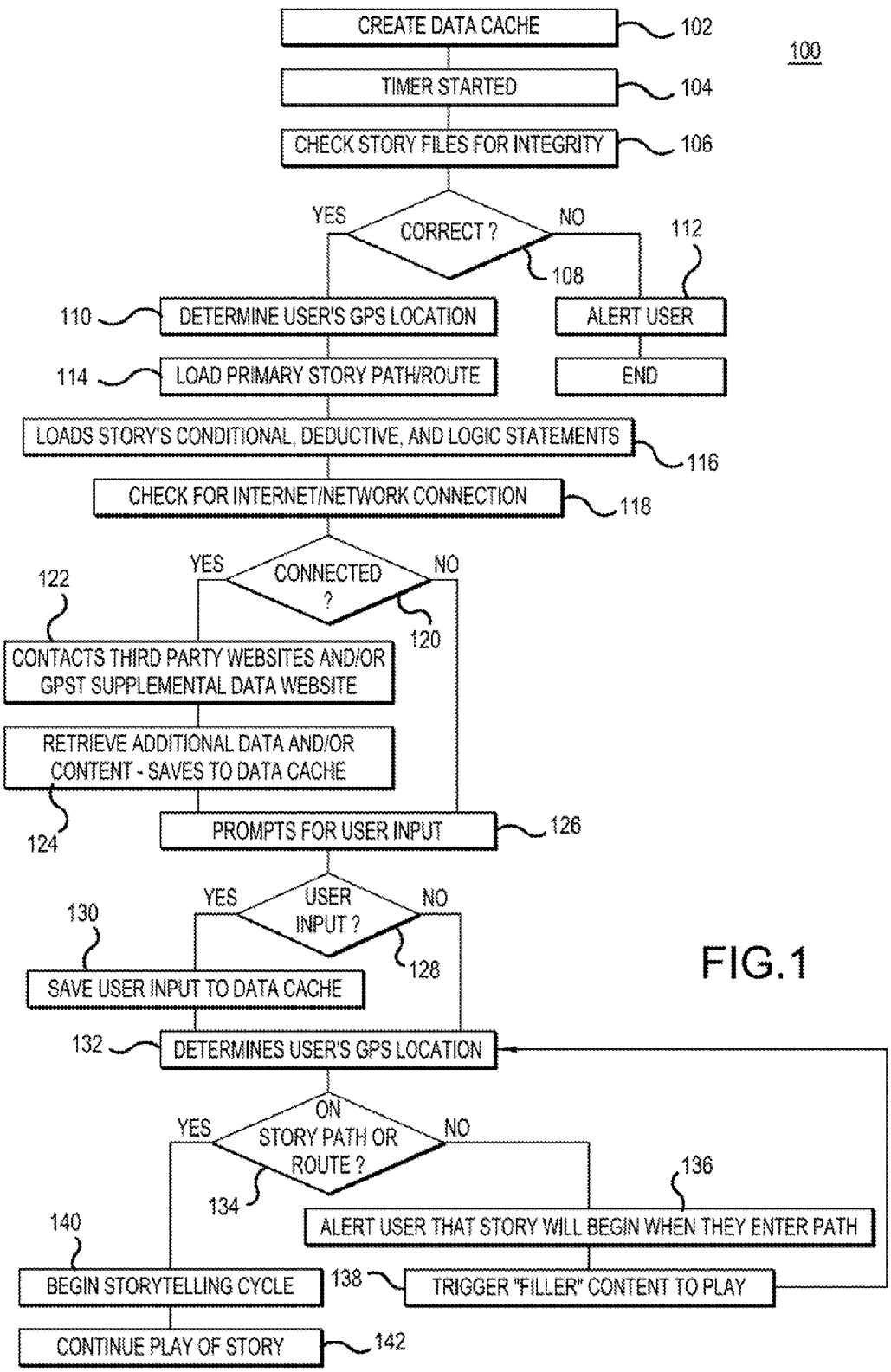
FIG. 1 illustrates a flow chart process depicting a startup phase according to an aspect of an embodiment of the present invention.

The invention features a GPS Theater (GPST), an entertainment content delivery application, installed on a communications system, mobile phone, device, tablet or similar device/system. In one aspect of an embodiment of the present invention, the entertainment content may be provided in the form of storytelling. Other forms of content are contemplated. The GPST provides immersive vehicle entertainment while travelling along a highway, interstate or toll road. The acronym, "GPST" and phrases "GPST application" & "GPST application system" may all be used to interchangeably mean the application (and/or software) or the system (including devices, hardware, etc. involved) used in the implementation of the contemplated invention.

Alternatively, in one aspect of an embodiment of the present invention, the application may be integrated with a standalone device with GPS capabilities.

The GPST, in one aspect of an embodiment of the present invention, could be incorporated or built-in to existing vehicle computers, GPS systems and/or added to third-party GPS devices (e.g. Tom-Tom, etc). Entertainment content could be browsed and downloaded to those systems, or devices, or transferred to vehicles via USB drive or other portable file storage device.

In different aspects of embodiments of the present invention, the GPST may access a user's device to collect certain data and or to use certain functions depending on the device and permission enabled/disabled. This information would be used to help make calculations and run logical and/or deductive reasoning functions. The collection and subsequent analysis of this data may or may not trigger conditional content. An exemplary, yet non-exhaustive list of some types of data the GPST might access and/or control for use, include: Location data (approximate (network) and precise (GPS)), phone, and email contacts, call logs, internet data, calendar data, pictures, video, record audio, compass, inertia data, ambient light data, gyroscope data, device unique IDs, network status, device storage, device status and identity, add or remove contacts, create accounts, fins accounts, create passwords, download files (with and without notification), upload files, connect and disconnect from Wi-Fi and/or networks, view all network/Wi-Fi connections, discover running apps, adjust volume, control vibration, or a combination thereof. This is not a complete list, only a sample. It does not reflect all available (or future) data types the GPST could possibly access and use. The GPST may also take and record video, picture and audio.

The entertainment content provided or used in the GPST application may have content ratings similar to movies and video games.

The GPST application system may also be used as an interactive gaming system to play games such as GPS-based car games like "I-Spy" and "car bingo" searching for items along a route; GPS-based Scavenger hunt virtual—after you drive and stop at a certain rest stop, go to the back corner of a certain restaurant—you receive—on your device—a golden medallion or the like. The GPST can be set to tour mode to provide educational or site seeing tours. Licensed characters such as Dora the Explore, for example, can journey across a highway.

To use the system, a user may download the GPST "App" from a content provider such as the iTunes store or any other application store. The user would browse GPS entertainment content in the iTunes store or other content provider. Then, the user searches for content based on the route of your upcoming trip. For example, if the user searches "Pennsylvania/Pennsylvania Turnpike/Exits 1-25", the results may show, for instance, 55 titles from which the user may then choose. Available story titles may then be displayed under the search criteria. A description includes how much of your route each story "spans or covers." For example, under the Title "Jenny's Secret," it shows "Intended for play between PA TPK Eastbound exit 1-5." Another option may be a scary story such as Ghost Riders that will cover exits 5-25.

As a sample story and scenario, let's say the scary story "Ghost Riders—Death's Hitchhikers" was written specifically for playback during a ride on the Pennsylvania Turnpike Eastbound exit 5-25. When you drive along the PA turnpike and play the story, a variety of ghosts enter your vehicle (or appear to do so as a result of the GPST generated sound effects) along the way. Their entry into the story is triggered by your GPS location. There are sound effects as they fly in for a landing. There are bumping sounds as they land on your vehicle (also, GPST generated effects), and of course they talk; to themselves and to other ghosts. Along the route the ghosts tell tales of their lives, of course citing town names you are passing or will pass later. Landmarks that you pass will be mentioned in the story along the route. A great example of GPS triggering: as you are approaching a windmill farm, a ghost suddenly discloses, "Look, see that windmill farm coming up here on the right? Well . . . that's where my body is buried. Third wind mill from the right . . . no one's found it yet". Another example would be as you're travelling across a bridge, a ghost proclaims, "Lenny! Isn't this the bridge you jumped off?" Lenny replies, "I was pushed! I was pushed—damn it! As your vehicle nears a tunnel, one ghost says she loves the echo in this tunnel as exits the vehicle and you can hear her cheerful "Hello-lo-lo-lo-lo" and laughter. The use of GPS coordinates and GPS triggers is only limited by the imagination of the story creators.

Entertainment content such as stories may be recorded by voice actors, and use music and sound effects. The stories may be written to cover specific spans of Highways and interstates. These serve as the "story paths."

Since stories are written for specific GPS "paths," stories can be precisely tailored and customized to incorporate surrounding city names, geography, landmarks, exit numbers, and other near-permanent visuals (like billboards etc.) into the story as you pass by or are in the vicinity. Effectively, one may "drive through" the actual story in the locations as it is happening.

In an aspect of an embodiment of the present invention, background music, sound effects, or any other content such as an author's "Forward" may be played by GPST while a user approaches the story path.

In another aspect of an embodiment of the present invention, the GPST may allow users to create and upload content (audio, video, photos). For example, while driving along the turnpike and using the GPST Application, a user may notice a herd of cows in a field alongside of the road. The user may video tapes him/herself "mooing" at the cows, and perhaps capture a funny reaction from the cows. The user then uploads the video to the GPS User Database. The GPST may then prompt him to categorize the content e.g., humorous, informational, story element, point of interest etc. This content may then be available for play back by other GPST users when they pass by the same coordinates. Other users would "allow" playing of user created content, and may be enabled to select which types they allow based on categories. This allows users to contribute original content. This also allows a sort of a user "collective" to form a story or entertaining content. This content would only playback if another user "allows" user generated content to be played. This content could be in the form of photos, video, and/or audio. This content may be triggered by GPS location. This allows users to create their own stories, and build upon stories of other users. The GPST Application, has a section that allows users to browse user created stories and content. They can see that someone has created a story path along a route that they will be travelling and they choose to contribute to that story.

In an exemplary scenario a user may decide to contribute to a collaborative user generated story "Wild tales and Observations Along the PA Turnpike exits 28-158." The story path may trigger previously uploaded content from users. This maybe in the form of a story that multiple users have contributed to, or maybe jokes, maybe some local history, or maybe personal stories user tell of their own experiences. The story path can be observed by the user. The user can see which areas along the path are open for new "content" and which are not. The user generates content by recording audio, video, or photos along the route and may be asked by the GPST Application to confirm at which point in the path to trigger the content they've uploaded. This can be done in real-time as they drive, or later after they have left the path. User uploaded content is reviewed and approved by the story administrator—the person who opens or starts the original story.

In addition to browsing and purchasing content ahead of time, the GPS Theater, in another aspect of an embodiment of the present invention, may contain a built-in store that allows users to browse available content based on routes, or based on their current location.

The user connects his mobile phone or tablet to his vehicle sound system, and presses the icon for Ghost Riders. The GPST application opens and the user is prompted to answer a few questions that help determine some of the content to be triggered by user data. You press the play button and a personalized and custom story is told.

The stories are written to incorporate all of the real information and visuals along the route as possible. The information and visuals include scenic, geological, manmade, locale info/history, or anything else that can be used in the story.

The story is recorded by voice actors. Music and sound effects added. After recording and production, the files are broken down into short audio segments. The file format would be compatible with current mobile devices and tablets (like MP3 audio files). Aspects of embodiments of the present invention also contemplate display/play of video and images.

Segments can be as short as a few seconds, or as long as several minutes. Segments are organized in a file structure/hierarchy depending on their trigger/use. There are "Core triggered elements," which are slated to play when the vehicle hits predetermined coordinates. These elements provide the core of the story. There are also "conditional triggered elements," that play "IF" certain conditions exist, e.g., traffic jam, it becomes dark outside (mobile devices have ambient light sensors that can be used to trigger content) etc.

There would also be "user data triggered elements." This last group of elements consists of segments that would only play based on a user responded to initial question asked when they started the story. For example, segments created for an adult audience will not play if the user indicated a minor was present.

The stories cover all genres e.g., fiction, non-fiction, local history, science fiction etc.

In an aspect of an embodiment of the present invention, the GPST would not allow user created/uploaded content. They may be locked-down by the creators. Some stories would allow user content, and some stories would be created completely from user uploaded content.

The GPST constantly monitors and tracks a user's vehicle's location along a specified route. It analyzes the user's position against the story's path and triggers content at specific predetermined coordinates, and when it deduces or calculates that certain conditions exist. All content is prerecorded. It is played only when triggered by position, or certain GPS data and/or calculations.

There may be other types of data generated mobile device that GPS story creators can use as triggers. It should be noted that a trigger point or trigger, in an aspect of an embodiment of the present invention, may be a physical location, based on coordinates, that "lays in wait" up the road and may be passed (and/or activated) when the user is driving and passes the location. A trigger alert is what happens once a trigger point is reached. A trigger alert may also be what happens if certain conditions exist (if A and B are true, and C is false=trigger alert). Trigger alerts are contemplated as several triggers could be set off at the same time for example, those caused by passing physical locations, and those triggered by conditional statements being true. In order to collect all of the triggers and decide which was most important to play, the trigger alert is used to determine the priority of execution. In one sense, the trigger alert is akin to a "flag" saying for example, "this has been identified to be playing. Should I play it?"

Referring now to FIG. 1, a flow chart process 100 depicting a startup phase according to an aspect of an embodiment of the present invention, is shown. After the user has selected his/her choice of entertainment content from the GPST application and/or after the user has selected a story path or route, the GPST, in step 102 creates a data cache to store information related to the entertainment content, all processes/calculations etc. Here, the GPST, in one aspect of an embodiment of the present invention, may record information about the session and/or information about itself—as it runs. It may keep track of what it does, what it creates and keeps records of what happens, e.g., when the entertainment content (e.g. a story) started, whether it has played certain elements already, whether the application crashed, whether the user stopped the story halfway through etc. The information stored may be specific to the processes happening to execute the entertainment content. The GPST Application utilizes this data cache, in another aspect of an embodiment of the present invention, to determine whether a user has listened to a story before, and to determine how it knows which entertainment content elements have played. After the GPST application has been initiated or started, the data cache may be updated and new information may be added to it. In another aspect of an embodiment of the present invention, information may be taken from it during the analytic phase discussed later (e.g. has vehicle stopped? etc).

Next, in step 104 a timer is started. The timer, in one aspect of an embodiment of the present invention, may be used to calculate passage of time, the play duration of the entertainment content, or for other uses. After this, the GPST application system then in step 106 checks the entertainment content file(s) for integrity and path for proper formatting, structure, integrity and compatibility. The GPST Application system would check the entertainment content files before they would play to ensure proper and seamless play as content potentially would have been created by different companies. The GPST application system in step 108 then determines whether or not the entertainment content file(s) is compatible or whether the integrity of the file(s) is/are within the required parameters. If it/they are not, the user is alerted in step 112 and the application is discontinued. Alternatively, if the file(s) is/are of the proper integrity and/or are compatible for play and use, the system proceeds to step 110 where it determines the user's GPS position relative to story path or route selected. The application system then in step 114 loads the primary story path or route along a map. Story paths, in another aspect of an embodiment of the present invention, may be generated in conjunction and/or as a result of "maps". The map may be displayed electronically in the application itself, in a browser, or as pan of the GPS navigation or a visual reference for location. In an aspect of an embodiment of the present invention, a map may be displayed having the trigger points loaded in the map as coordinates.

In an aspect of an embodiment of the present invention, the GPST Application could be integrated and used with existing GPS navigation systems like Tom-Tom etc, or integrated with built-in vehicle navigation systems. In another aspect of an embodiment of the present invention, the map may be a path, sets of coordinates, string of coordinates along a route etc.

After loading the primary story path or route, the application system then in step 116 loads the entertainment content's conditional, deductive and/or logic statements. In one aspect of an embodiment of the present invention, this may entail the use of "IF then ELSE" statements e.g. If X is true, then execute Y, etc. These may be used to trigger additional "conditional" content. In one aspect of an embodiment of the present invention, the GPST application system can use "conditional" logic like "IF [a certain data condition exists], perform this action [name action]. These are parameters and conditions that are added in by the entertainment content creator. For example, a story creator may decide that if during a story, your vehicle exceeds 75 MPH, the system would trigger a funny joke in the story. Triggers could occur anytime this condition is met, or only if this condition is met during a specific time period, etc. An entertainment content creator may use this deductive reasoning to determine, IF the vehicle stops at more than three rest stops in a two hour period, to trigger a special joke from the "conditional content" part of the available story elements.

Next, in step 118, the application system checks for a network or other Internet connection. If connected, as determined in step 120, it, in step 122, contacts third party websites and/or GPST supplemental data website, upon which the system in step 124 retrieves additional data and/or content and saves it in the data cache. If connection with a network or the Internet is unsuccessful, the user is prompted for additional user input in step 126. This could be user's age, number of occupants, model of car, etc. Could be anything the story writer wants to use in the story. For example if user's answers that they drive an older car, in the previously discussed ghost story example above, a ghost may say, "Wow this car is as old as my grandmother, and smells like her too." It should be noted that the user may be prompted regardless of: the availability of an internet connection or with an actual internet connection having been made. Once the user is prompted, the system checks for user input in step 128. If input is provided, the application system saves the information, in step 130, in the data cache for later use or access.

In situations where a user is running the application but they are unable to access certain information like time, date, etc. if the user has a network connection, the application is enabled, in one aspect of an embodiment of the present invention, to contact a web-based Supplemental GPS Theater Application and Database (SGPSTAD). In this aspect, the application will communicate the user's location (based on GPS data) to SGPSTAD. SGPSTAD would then collect all available data related to the user's GPS position, e.g., time, date, local weather, traffic etc., and reports this information back to the application. The application can then use this info (or not use it) to trigger additional content. An exemplary scenario may be thus: Without the SGPSTAD, the GPST Application deduces (based on speed of vehicle and limited forward movement) that traffic has slowed significantly, which could trigger conditional content such as a Ghost proclaiming "Wow, we are really slowing down here." However with the supplemental info provided by SGPSTAD, the GPST application may know specifically that the slowdown is due to an accident 5 miles ahead and conditional content could be triggered with the Ghost proclaiming, "Wow, I can see an accident ahead. That's what's causing this backup."

The GPST application may also monitor all available device data. Much like software programming, the GPST can make calculations, and deductive logic decisions with provided data. Playback of GPS stories are also affected by various other conditions and variables including vehicle speed, frequency of vehicle stops, time of year, time of day, etc.

Triggered points may be both pre-determined and conditional. The trigger points may also be pre-determined and conditional based on GPS coordinates, user inputted data, device data or logic and deductive reasoning.

A story's basic framework is built upon a "primary story path." Stories are written to unfold along a set or string of GPS coordinates. A story could be written to play for 300 miles, and require 100 trigger points to tell the story. It should be noted that during story creation—that in addition to writing for the primary story path—the writer also factors in all of the other possible conditions and variables that can be monitored during story playback. The authors can create special alternative content that can be triggered if certain conditions exist. Below are some samples of content triggered by other calculations and/or conditions. It should also be noted that the invention is not intended to be limited to use of a specific entertainment content i.e. a story and that the use of the story type of entertainment content is purely illustrative and limiting.

Story paths, in another aspect of an embodiment of the present invention, may be generated in conjunction and/or as a result of "maps". Map may be displayed electronically in the application itself, in a browser, or as part of the GPS navigation or a visual reference for location. In an aspect of an embodiment of the present invention, a map may be displayed having the trigger points loaded in the map as coordinates.

In an aspect of an embodiment of the present invention, the GPST Application could be integrated and used with existing GPS navigation systems like Tom-Tom etc, or integrated with built-in vehicle navigation systems. In another aspect of an embodiment of the present invention, the map may be a path, sets of coordinates, string of coordinates along a route etc.

In addition to tracking vehicle location to trigger story content, the GPST may also use a variety of other information including variables, calculations, and logic to trigger additional "conditional" story elements. Using common computer programming logic, "IF a certain condition exist, THEN, perform a certain task, or WHILE a condition exists perform (or don't perform a task). Called "IF, THEN, and WHILE" statements in programming.

The GPST can calculate whether the vehicle is speeding, going too slow, has come to a stop along the path, or if it has left the path. All of these scenarios could trigger additional content; a ghost character exclaims, "Why are we stopping?" "Another rest stop already, really?" Long delays could trigger "filler" content like music or extended content (like ghost having a sing-a-long), or it could prompt the user to pause or stop the story playback, "It seems you may be delayed in your travels. Would you like to stop the story?"

The previous examples use single conditions e.g., if a vehicle stops along path for greater than 5 minutes" etc to trigger additional content. The GPST can also evaluate a complex mix of variables and circumstances to trigger even more content. If the story is played back more than 3 time in its entirety, AND IF it was played back at night every time, AND IF the vehicle completes the journey within roughly the same amount of time—every time, resulting calculations trigger content: ghost says, "Wow, I've been in this vehicle a lot with you. You must enjoy my company."

Video clips could also be played by triggers. For example, a sci-fi story may trigger a message from "Command Center—Alpha" A military officer appears on the screen and gives an update on the rebellion. Holographic images could be projected on the sides, and back windows of the vehicle. A space ship could be shown flying besides their car weaving closer and closer.

In addition to audio, video, and images being triggered to play along a story path, the GPST can also be used to trigger visuals to display on the vehicle's windows. In one example a user could be enjoying an alien invasion story on the GPST, and when triggered by location or conditional trigger, a space ship could be projected onto the back and side windows giving the appearance that the space ship is flying around the vehicle. This visual could be projected onto the windows using traditional Heads-Up-Display (HUD), LED lights, mirrors reflecting, or laser HUD. The GPST may be connected to the vehicle's built-in HUD (or other) unit, or GPST "add-ons" could be purchased and mounted in different areas of the vehicle to project or transmit light onto the windows.

The user can alternatively input data. The User enters information at story startup. This information may be the year and make of vehicle, number of occupants, no minors, for example. During ghost story, in which ghosts are in the vehicle, a character proclaims, "I love the way these newer foreign cars handle!" Because there are no minors, content is played that may be a little more "risky" e.g., sexual innuendo, vulgarity in characters dialog. If the user enters that they are the sole occupant, content could be triggered like a ghost saying, "Looks like it's just you and me on this long journey."

Data such as date, time of day, system tools, personal info, and hardware controls can be analyzed to trigger additional content. Because of the date and time, the system can identify a season and time of day such as daytime or nighttime. Because of this, other "conditional" content could be triggered. A character states, "I hate the winter, especially at nighttime. It is so cold and lifeless." Access to hardware controls allows the system to adjust the volume to optimum levels, especially for sound effects.

Some entertainment content elements may have "conditional triggers." these are only triggered under certain circumstances. They depend on changes to certain GPS parameters built into the story. For example, if you are stuck in traffic too long, content will be triggered and added to the story. In the Ghost story example, previously discussed above, one Ghost may say, "Well, seems like we aren't going to get to Philadelphia anytime soon with this slowdown!" The triggering point would be the vehicle speed, for example. Again, if a car is going too fast, one Ghost may say to another, "If the driver doesn't slow down, they may be joining the ranks of us ghosts, and soon!" Also, music and/or funny "filler" content will be available for long traffic stoppages, like a seemingly impromptu ghost sing-a-long, "Does everyone know 99 bottles of beer?" a ghosts asks, and then begins singing. Other ghosts encourage him to stop. Multiple visits to rest stops triggers, "Ugh are we stopping again?

Before story playback begins, you may be asked to answer a few yes/no questions. For example, is there more than one person in the car? Are there any minors? This information may be used to unlock additional "conditional" content and add additional personalization to the story.

All content and information needed for playback is included in the file structure when a story is downloaded to a device. All content is already fully written, customized, recorded and ready for playback. In another aspect of an embodiment of the present invention, additional content, and updates, are available for download if the user has a network or internet connection during playback (new data may comes via the supplemental database).

Referring now back to FIG. 1, if no input is received as a result of the determination in step 128, (or after received input in step 130 has been cached), the system proceeds to step 132 where the user's GPS location is determined. Next, the process proceeds to step 134 where the system checks, whether the user is on the story path or route. If the user is not in close proximity to, or not on, a selected story path, the GPST application notifies the user in step 136 that the story will begin when they enter the path. This could be done by playing a message, "Your story will begin once you enter the story's path" or the like. After the notification in step 136, the application system may be triggered in step 138 to play "filler" content such as music, sound effects, or the author's "Forward" (like the beginning of a novel) until the user enters the story path or route as the process then loops from the play of the filler content at 138 back to decisional diamond 134. If, however, the user is on the story path or route, then the process will proceed from decisional diamond 134 to 140 where the storytelling cycle begins. This cycle may entail play of entertainment content (in this example, a story). In another aspect of an embodiment of the present invention, the system may check after step 138 whether the user was already alerted and/or whether filler content was already playing before the process reverts back to decisional diamond 134 after this/these determination(s).

Once the storytelling begins in step 140 the system proceeds to step 142 at which the system continues to play the entertainment content (here, for example, a story). The process then proceeds to step 202 of FIG. 2.

Figure 2:
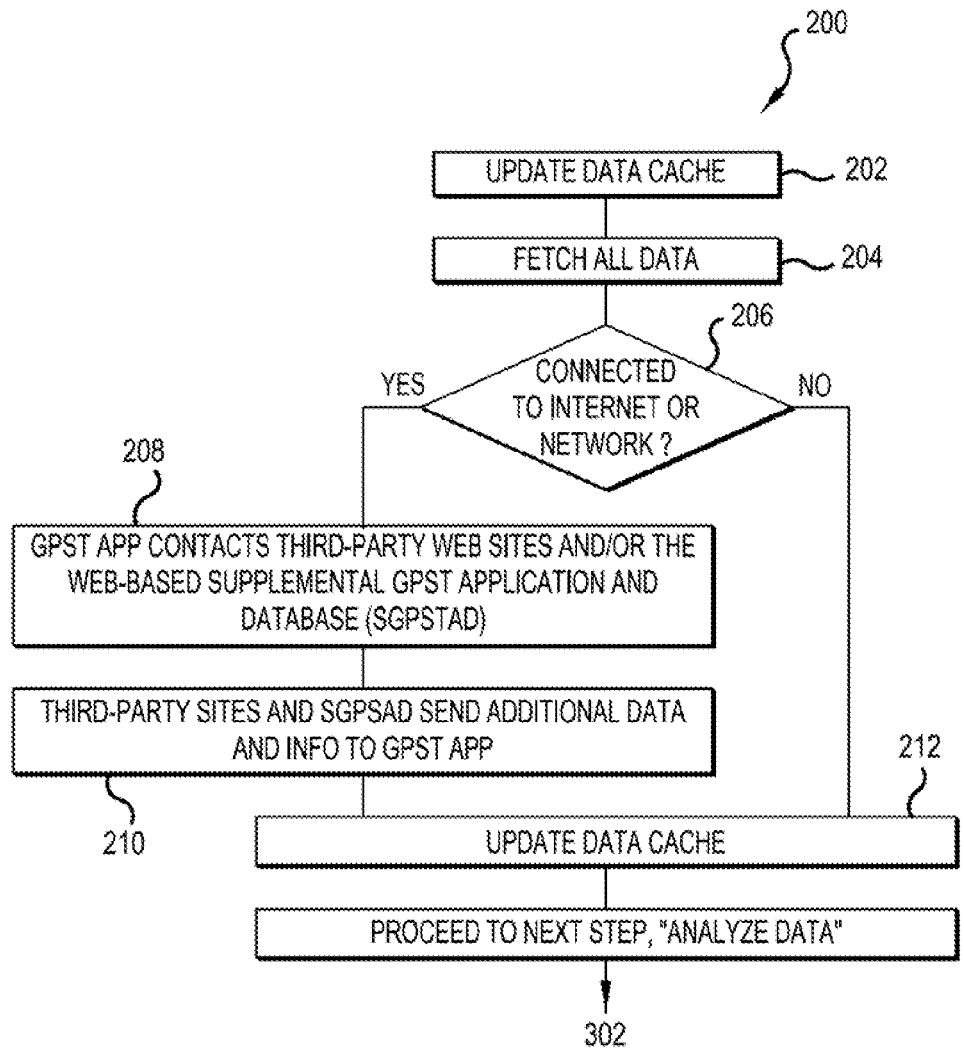
FIG. 2 illustrates a flow chart process depicting a storytelling cycle according to an aspect of an embodiment of the present invention.
Figure 3:
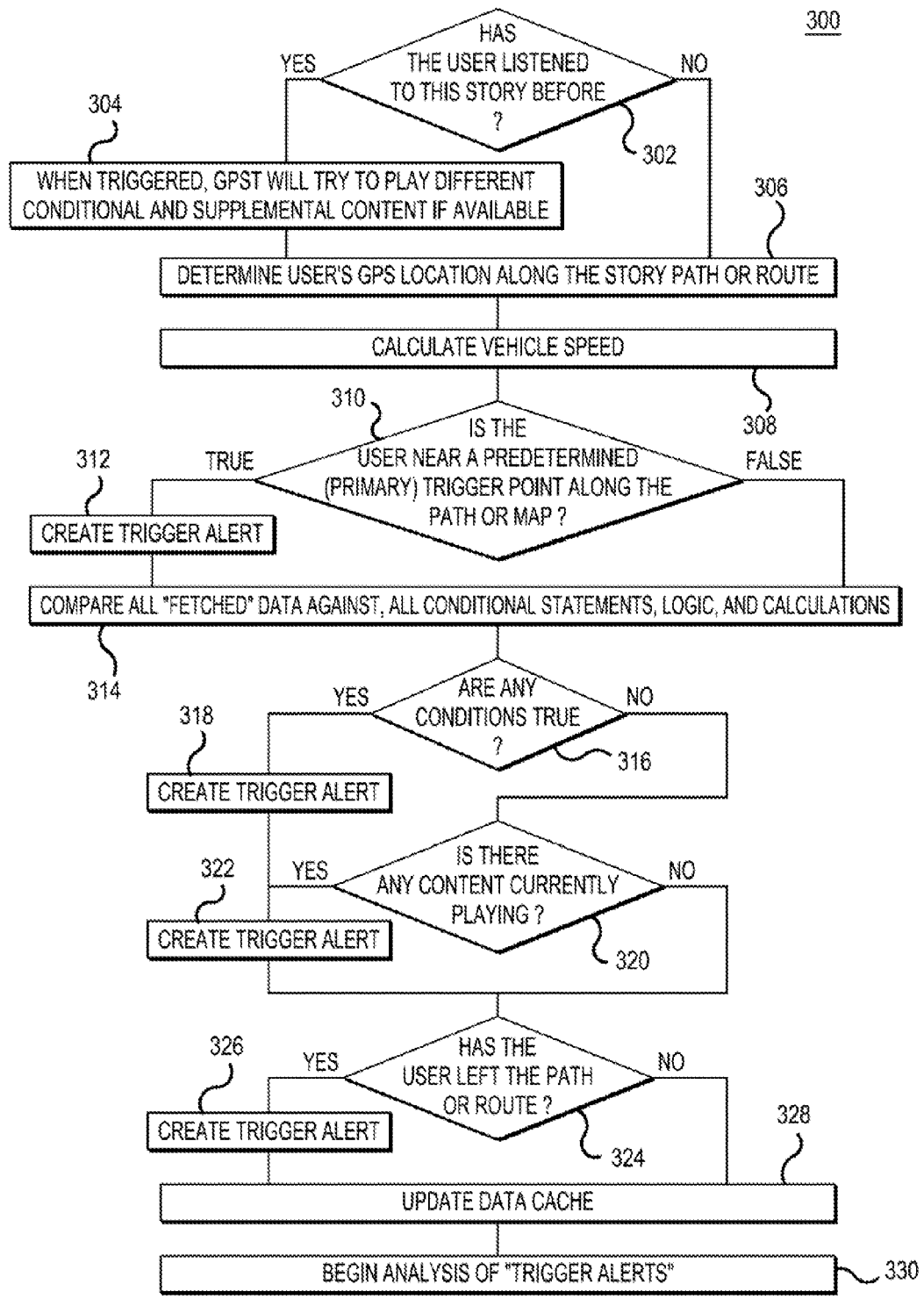
FIG. 3 illustrates a flow chart process depicting continuation of the storytelling cycle and additionally depicting data analysis according to an aspect of an embodiment of the present invention.

Referring now to FIG. 2 a flow chart process 200 depicting a storytelling cycle according to an aspect of an embodiment of the present invention, is shown. Here, the data cache in step 202 is updated by the GPST application saves all pertinent info up to this point. Next the GPST application in step 204 obtains data which may include data sent by third party websites and/or GPST supplemental data website, GPS position data and/or user entered data. Device data (e.g. ambient light, date, time, compass etc.) may also be obtained from the data cache. The user's GPS positioning data and device data such as light and compass data, for example, may also be retrieved or obtained from the GPS. All user data that the user entered during the question and answer launch is retrieved from the system. Cycle data is retrieved from the system, as shown in FIG. 3. All data retrieved or obtained is then analyzed and compared against the primary GPS story plan and story path, which may include pre-planned GPS trigger points, "conditional" trigger events and other criteria and data central to monitoring and controlling the story synchronization.

The GPST, in one aspect of an embodiment of the present invention, may perform deductive reasoning, calculations (speed etc.) and may also execute logic based formulas (if "this condition" exists, "then" perform "this" function) and determine whether any primary or conditional story content should be triggered. Based on the triggers, the entertainment content (such as a story) is played or does not play. The system logs information related to the cycle such as actions performed, progress of the entertainment content, errors, for example in its data cache. In one aspect of an embodiment of the present invention, the cycle may repeat itself.

In different aspects of embodiments of the present invention, the GPST application may access the user's device to collect certain data and to use certain functions depending on the device and permission enabled/disabled. This information would be used to help make calculations and run logical and/or deductive reasoning functions. The collection and subsequent analysis of this data may or not trigger conditional content. An exemplary list of data types the GPST application might access, and parts of device it may control for use include: Location data (approximate (network) and precise (GPS)), phone, and email contacts, call logs, internet data, calendar data, take pictures and video, record audio, compass, inertia data, ambient light data, gyroscope data, device unique IDs, network status, device storage, device status and identity. At the same time, the GPST may be enabled to perform, in another aspect of an embodiment of the present invention, a number of functions on the device such as, for example: add or remove contacts, create accounts, fins accounts, create passwords, download files (with and without notification), upload files, connect and disconnect from Wi-Fi and/or networks, view all network/Wi-Fi connections, discover running apps, adjust volume, control vibration.

Referring now back to FIG. 2, the GPST, then in step 206 determines whether the system is connected to the internet or to a network. Where it is determined it is, the process proceeds to step 208 where the application contacts third-party web sites and/or the web-based Supplemental GPST Application and Database (SGPSTAD). Either or all or a combination of these sites or databases, in step 210, upon being contacted, may send additional information to the application. The data cache is then updated in step 212 based on this new information/data and the process proceeds to the next phase beginning with step 302 of FIG. 3.

Referring now to FIG. 3 a process flow chart 300, depicting a continuation of the storytelling cycle and depicting data analysis according to an aspect of an embodiment of the present invention, is shown. Using the data collected in steps 204 and 212, the GPST Application goes into its analytical cycle where it performs a myriad of logic functions, comparisons, and evaluations. The results of this process will be sent to the "trigger cycle" to determine what content (if any) should be played for the user. At step 302, the application system determines whether the user has listened to the story before or whether a particular kind of entertainment content has been presented to the user before. Where this is the case, the application system can adapt content to give the user a different story or a modified version of the same story in step 304. In one aspect of an embodiment of the present invention, this may include new individual elements that the user has not heard or seen before. Where, in step 302, it is determined that the user has not listened to the story before (or following the system's presentation of the different story or other entertainment content) the application system determines, in step 306, the user's GPS location along the story path or route. In another aspect of an embodiment of the present invention, the application may check to see whether the user is still on the path. If the user is not on the story path, the GPST Application then determines whether the user has left the path completely (e.g. taken an exit or taken a detour), and, after a predetermined length of time the user will be asked by GPST if they would like to quit playback (play or presentation of the entertainment content) or pause playback.

Next, the application calculates the vehicle speed in step 308. In an aspect of an embodiment of the present invention the application may also compare the user's location to predetermined trigger points along a story path or map. The application then checks in step 310 whether a user is near a predetermined trigger point along the story path or map. If a specific preset trigger point is reached, an internal "trigger alert" is created in step 312. After the creation of the trigger alert or if the application determines that the user is not near a trigger point, the application in step 314 compares all fetched or retrieved data against all conditional statements, logic and calculations and determines, in step 316, whether or not any of the conditions are true. In another aspect of an embodiment of the present invention, the application may calculate the user's vehicle speed (based on the time it takes the user to move between two GPS locations) and may also calculate how long a story or other entertainment content has been playing.

If the conditions in step 316 are false, the process proceeds to step 320 where the GPST determines whether content is currently playing. Where the conditions from step 316 are true, the application in step 318 creates another trigger alert. The application, in one aspect of an embodiment of the present invention, may analyze all collected and known data against "conditional, logic, and deductive algorithms," to determine, or deduce that certain conditions exist—which then would create a "trigger alert" which could then trigger "conditional" content. This could be anything, basically (if X is true, the execute Y); or even more complex, If A and B are true, while Condition C=D, and E is false, then execute Y.

A few exemplary scenarios are provided below. Creation of "conditional triggers" may be limited only by the imagination of the story creators. In one aspect of an embodiment of the present invention, the GPST may determine the time it takes a user to drive between two GPS positions and then may use this time calculation to calculate the user's speed. From this, the GPST Application can deduce if a user is stopped in traffic, speeding, or going very slow, thereby triggering a character in the story (in this case where the entertainment content is a story) to proclaim, "Wow, I wonder why traffic has stopped".

In another aspect, GPS Positioning and time calculations can be used by the GPST to deduce that a user has stopped numerous times at rest stops, triggering a character in the story (in this case where the entertainment content is a story) to ask, "Wow, are we stopping again?"

Date, GPS position, and time of day may be used, in another aspect, by the GPST to trigger a character to state "I hate these cold winter nights."

In situations where the user was prompted to answer how many riders are in vehicle, if the user inputted "3", the GPST can deduce that someone must be in the back seat based on the number of occupants and at some point in the story conditional content could be triggered, whereby a character may exclaim, "Hey you in the back seat. What are you looking at?"

Based on data garnered from GPS position, timing, and user prompts ("would you like to pause playback?"), the GPST, in another aspect of an embodiment of the present invention, can determine that "filler" content should be triggered. Content (like custom music or sing-a-longs) created to fill in during long delays—when the user doesn't want to pause playback—may then be played.

The GPST may monitor and track the user's vehicle along a travel route and play prerecorded story content that is "triggered" or played at numerous GPS coordinates or trigger points. Other GPS or device data may be used to trigger additional prerecorded content for the story such as conditional content. The system also uses logic and calculations based on data to trigger even more prerecorded or conditional content.

The GPST may also, in another aspect of an embodiment of the present invention, synchronize entertainment content elements to play based on the user's GPS position.

Referring now back to FIG. 3, after the creation of the trigger alert in step 318, the process proceeds to step 320 where the GPST determines whether content is currently playing. If content is shown to be playing, the GPST creates another trigger alert in step 322 and then proceeds to step 324. If no content is shown to be playing, the process also moves to step 324 where it is determined (in step 324) whether or not the user has left the path or route. If the user has, the application creates another trigger alert in step 326 and proceeds to step 328. Where the user has not left the path, the process proceeds from step 324 to step 328 where the application system updates the data cache with all the information obtained, retrieved, and created thus far. The process then proceeds to step 330 where analysis of the trigger alerts takes place. The process then proceeds to the next phase beginning with step 402 of FIG. 4.

Figure 4:
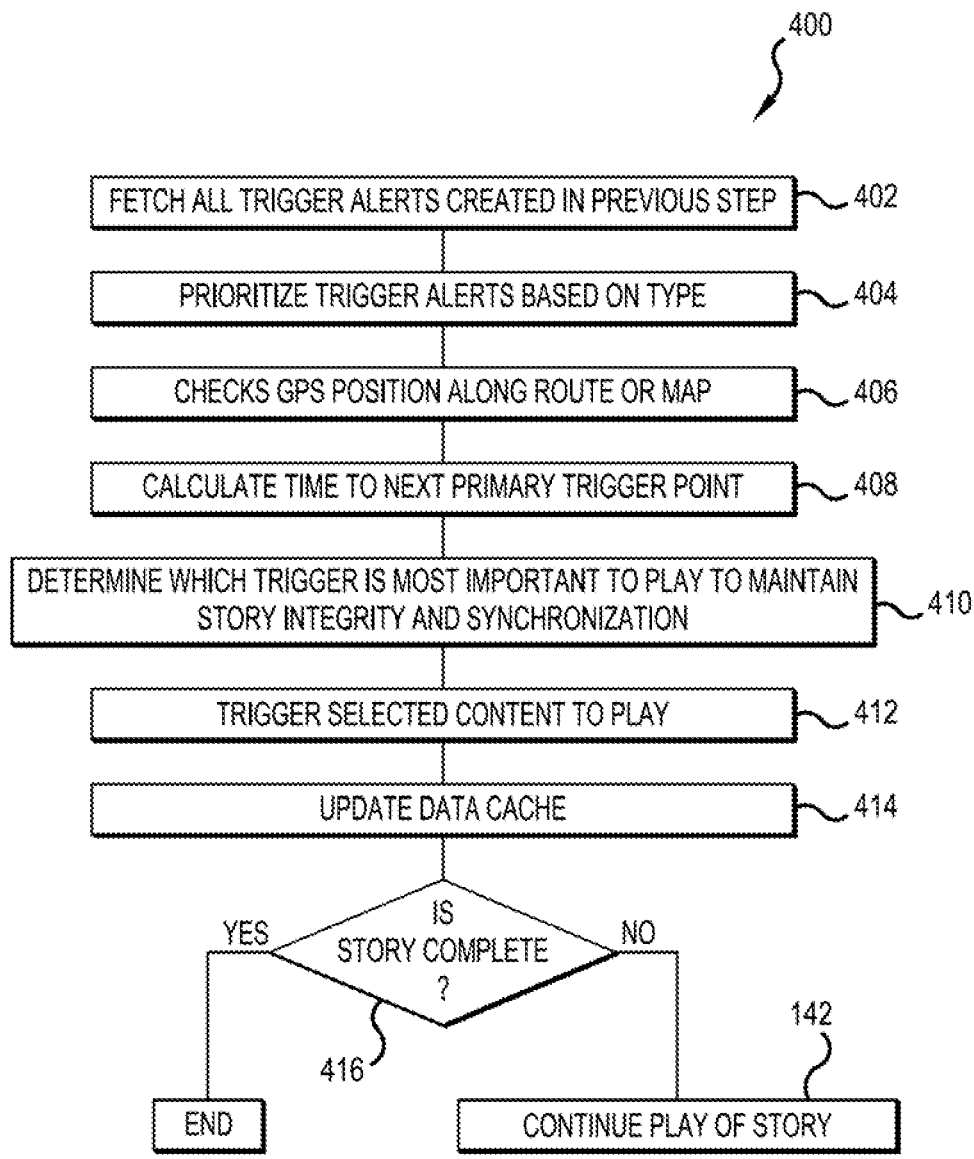
FIG. 4 illustrates a flow chart process depicting a continuation of the storytelling cycle and additionally depicting story trigger elements according to an aspect of an embodiment of the present invention.

Referring now to FIG. 4 a flow chart process 400 depicting a continuation of the storytelling cycle and depicting story trigger elements according to an aspect of an embodiment of the present invention is shown. The functions of the steps in process 400 are to consider all "trigger alerts" and decide which content to play for the user.

Here, in step 402, the GPST Application fetches all trigger alerts created in process 300. The GPST then in step 404, prioritizes trigger alerts based on type. The GPST Application may identify each trigger as either primary, secondary, conditional, filler, command (e.g. where the application communicates to the user). The GPST application will prioritize and decide which triggers to play so that critical story elements (primary) are played while maintaining story synchronization. It may also look for gaps (no content playing) and play "filler" content, or conditional content to fill the void. The GPST may also consider what is currently playing, what has been triggered to play, and what needs to play at the next primary trigger point. It will adjust the timing of content playback (decided what to drop and what to play) to provide the most seamless playback of content while maintaining synchronization.

Next in step 406, the GPST checks the user's GPS position along route or map after which the GPST calculates, in step 408, the time to the next primary trigger point (to help maintain synchronization). Then GPST, in step 410, determines which trigger is most important to play and checks that story playback is synchronized along path (may drop content, or adjust playback time to maintain synchronization). In one aspect of an embodiment of the present invention, it may also calculate whether playing a selected trigger element will maintain synchronization. If not, another element that will not adversely affect synchronization may be selected to play.

Next, in step 412, the GPST may trigger content to play (or not). Content could be audio, video, images, or projection onto window(s). As a vehicle drives along the story path or route, a myriad of different trigger alerts may be created. Following this, in step 414 the data cache is updated based on all the information retrieved, obtained or created thus far and then the GPST in step 416 determines whether or not the play of the entertainment content (or story) is complete. If it is, the process ends. If not, the process proceeds to step 142 to continue playing the entertainment content, which, in one aspect of an embodiment of the present invention, may be a story. Other entertainment content types are also envisioned or contemplated.

Figure 5A:
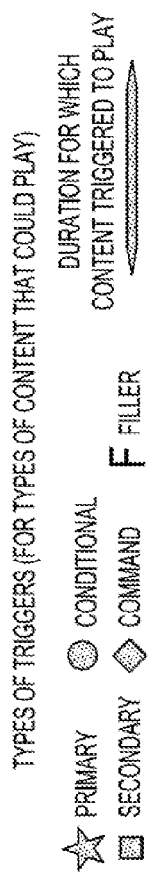
FIGS. 5A & 5B illustrate schematic depictions of a vehicle with the application travelling along a path or route according to aspects of embodiments of the present invention.
Figure 5A:
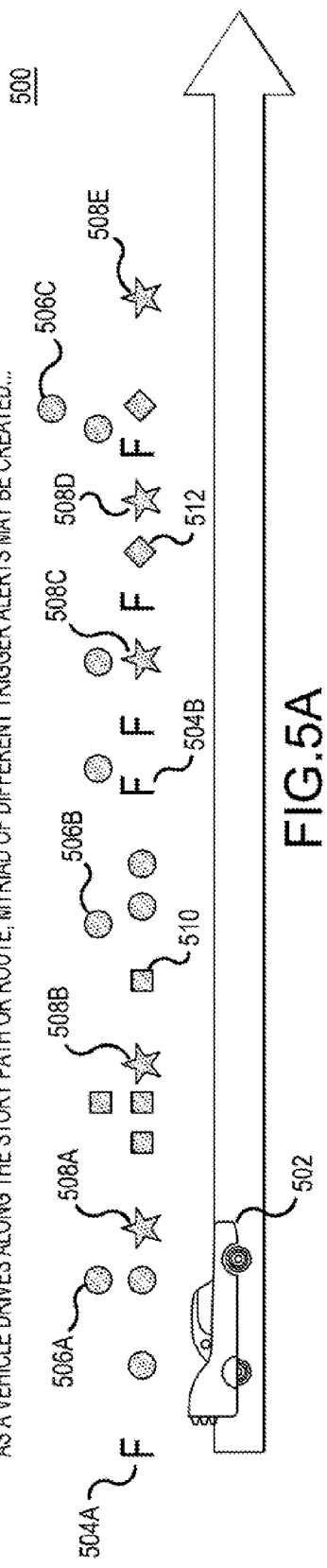
Figure 5B:
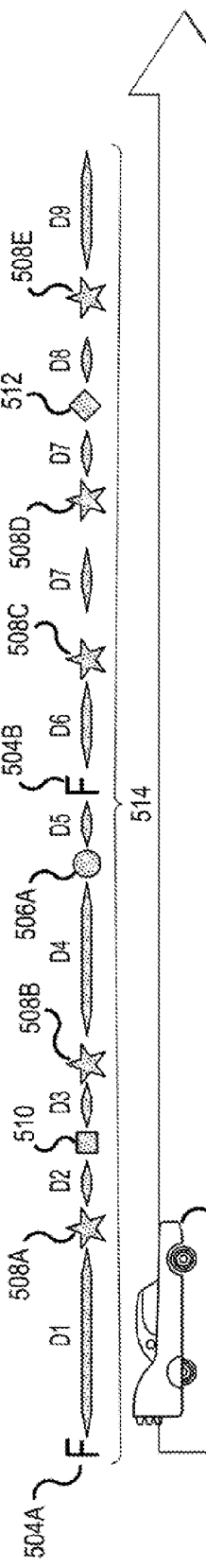

Referring now to FIGS. 5A & 5B, schematic depictions of a vehicle with the application travelling having a story path or route 5X) according to aspects of embodiments of the present invention are shown. In FIG. SA, story path or route 500 is shown having a plurality of triggers of different type including, for example, conditional (506A, B and C), Primary (508A, B, C. D and E), Secondary (510) and command 512 along with Filler 504A & 504B. FIG. SA represents, in one aspect of an embodiment of the present invention, a depiction of the triggers created, collected in process 300. They are, upon prioritization in step 404 of process 400, then selected for play and arranged for play as shown in FIG. 5B. Filler content (504A and 504B) are provided where the GPST determines they are necessary to be played while also maintaining synchronization and keeping to the central or primary theme of the entertainment content (e.g. story) being played (514). Play of specific entertainment content are triggered by the different prioritized triggers as shown in FIG. 5B. For instance, filler 504A plays for a duration, D1 and precedes play of entertainment content which is triggered by primary trigger 508A. This content plays for a duration D2 after which additional content is played upon trigger by conditional trigger 510. After playing for duration D3, more entertainment content is played once triggered by primary trigger 508B. The process of playing entertainment content continues for durations D4, D5, D6, D7. D8 and D9 upon their triggers by conditional trigger 506A, filler 504B, primary triggers 508C & 508D, command trigger 512 and primary trigger 508E. Filler content (such as 504A & 504B)

are provided where the GPST determines they are necessary to be played while also maintaining synchronization and keeping to the central or primary theme of the entertainment content (e.g. story) being played (514).

Each story contains a data file identifying a "primary trigger plan." This plan plots the primary story elements out along the route. This allows elements that need to play to coincide with known/fixed objects and landmarks to synch the story properly. The GPS monitors the vehicle position and triggers these items at predetermined specific GPS coordinates.

The invention has been described in detail with particular reference to certain preferred embodiments thereof, but it will be understood that variations and modifications can be effected within the spirit and scope of the invention.

The invention claimed is:

1. A method for generating GPS-enabled entertainment using a GPS system having a computer processor, said method comprising the steps of the GPS system:
   determining a user's GPS location, wherein said user is travelling in a vehicle;
   loading at least one story path in the GPS system having at least one pre-determined trigger point, each said at least one predetermined trigger point being embedded within said at least one story path and wherein each said at least one predetermined trigger point is set up to trigger play of at least one entertainment content while said vehicle travels along said story path;
   comparing said user's GPS location with said at least one story path;
   providing said user with said at least one entertainment content based on said at least one pre-determined trigger point; and
   providing interactive activity or effects consistent with said at least one story path, said at least one entertainment content and at least one current travel condition of said user's vehicle,
   wherein the current travel condition triggers additional entertainment content and integrates the current travel condition into the story path,
   wherein the current travel condition comprises speed, frequency of vehicle stops, time of year, passenger information, or time of day.

2. The method according to claim 1, further comprising the step of using conditional, deductive and logic statements to determine conditional content to play within said at least one story path.

3. The method of claim 1, further comprising the step of determining whether or not to continue playing said at least one entertainment content where said user is no longer on said at least one story path.

4. The method of claim 1, further comprising the step of playing conditional content based on said user's real-time conditions.

5. The method of claim 1, further comprising the step of adding new content to said at least one story path.

6. The method of claim 5, further comprising the step of setting play conditions within said at least one story path for playing said new content.

7. The method of claim 1, wherein said provision of interactive activity/effects is as a result of at least one trigger.

8. The method of claim 1, wherein said provision of interactive activity/effects is based upon user input.

9. The method of claim 1, further comprising the step of performing deductive reasoning calculation and executing logic formulae to determine whether entertainment content should be triggered.

10. The method of claim 1, further comprising the step of synchronizing the provision of said at least one entertainment content with said user's movement or location.

11. The method of claim 10, further comprising the step of adjusting the timing of play of said at least one entertainment content to provide seamless play while maintaining synchronization.

12. The method of claim 1, further comprising the step of detecting gaps in said at least one story path during the provision of said at least one entertainment content.

13. The method of claim 12, further comprising the step of providing filler or conditional content where a gap has been detected.

14. The method of claim 1, further comprising the steps of:
   prioritizing said at least one predetermined trigger point; and
   maintaining story synchronization.

15. The method of claim 1, further comprising the step of calculating whether synchronization is maintained as a result of play of said at least one entertainment content based on said at least one trigger point.

16. A method for generating GPS-enabled entertainment using a GPS system having a computer processor, said method comprising the steps of the GPS system:
   determining a user's GPS location, wherein said user is travelling in a vehicle;
   loading at least one story path in the GPS system having at least one pre-determined trigger point, each said at least one predetermined trigger point being embedded within said at least one story path and wherein each said at least one predetermined trigger point is set up to trigger play of at least one entertainment content while said vehicle travels along said story path;
   comparing said user's GPS location with said at least one story path;
   providing said user with said at least one entertainment content based on said at least one pre-determined trigger point; and
   providing interactive activity or effects consistent with said at least one story path, said at least one entertainment content and at least one current travel condition of said user's vehicle; and
   determining whether said at least one entertainment content had been played before and providing different conditional content if said at least one entertainment content had been played before.

17. The method of claim 16, further comprising the step of changing said at least one entertainment content when said vehicle stops.

18. A method for generating GPS-enabled entertainment using a GPS system having a computer processor, said method comprising the steps of the GPS system:
   determining a user's GPS location, wherein said user is travelling in a vehicle;
   loading at least one story path having at least one pre-determined trigger point, each said at least one predetermined trigger point being embedded within said at least one story path and wherein each said at least one predetermined trigger point is set up to trigger play of at least one entertainment content while said vehicle travels along said story path;
   comparing said user's GPS location with said at least one story path;
   providing said user with said at least one entertainment content based on said at least one pre-determined trigger point;

providing interactive activity or effects consistent with said at least one story path, said at least one entertainment content and at least one current travel condition of said user's vehicle; and prioritizing said at least one trigger point to determine which said at least one trigger point are to be triggered to ensure that critical elements of said at least one entertainment content are played while maintaining synchronization with said user's travel route.

19. A computer program product comprising a computer usable medium having control logic stored therein for causing a computer processor to generate GPS-enabled entertainment, said control logic comprising:
non-transitory computer readable program code for determining a user's GPS location, wherein said user is travelling in a vehicle;
non-transitory computer readable program code for loading at least one story path having at least one predetermined trigger point, each said at least one predetermined trigger point being embedded within said at least one story path and wherein each said at least one predetermined trigger point is set up to trigger play of at least one entertainment content while said vehicle travels along said story path;
non-transitory computer readable program code for comparing said user's GPS location with said at least one story path;
non-transitory computer readable program code for providing said user with said at least one entertainment content based on said at least one pre-determined trigger point;
non-transitory computer readable program code for providing interactive activity or effects consistent with said at least one story path, said at least one entertainment content and at least one current travel condition of said user's vehicle; and
non-transitory computer readable program code for determining whether said at least one entertainment content had been played before and providing different conditional content if said at least one entertainment content had been played before.

20. The computer program product according to claim 19, further comprising non-transitory computer readable program code for using conditional, deductive and logic statements to determine conditional content to play within said at least one story path.

21. The computer program product according to claim 19, further comprising the steps of: determining whether said at least one entertainment content had been played before and providing different conditional content if said at least one entertainment content had been played before.

22. The computer program product of claim 19, further comprising non-transitory computer readable program code for determining whether or not to continue playing said at least one entertainment content where said user is no longer on said at least one story path.

23. The computer program product of claim 19, further comprising non-transitory computer readable program code for playing conditional content based on said user's real-time conditions.

24. The computer program product of claim 19, further comprising non-transitory computer readable program code for enabling addition of new content to said at least one story path.

25. The computer program product of claim 24, further comprising non-transitory computer readable program code for setting play conditions within said at least one story path for playing said new content.

26. The computer program product of claim 19, further comprising non-transitory computer readable program code for providing interactive activity or effects consistent with said at least one story path, entertainment content and at least one current travel condition of said user.

27. The computer program product of claim 19, wherein said provision of interactive activity/effects is as a result of at least one trigger.

28. The computer program product of claim 19, wherein said provision of interactive activity/effects is based upon user input.

29. The computer program product of claim 19, further comprising non-transitory computer readable program code for performing deductive reasoning calculation and executing logic formulae to determine whether entertainment content should be triggered.

30. The computer program product of claim 19, further comprising non-transitory computer readable program code for synchronizing the provision of said at least one entertainment content with said user's movement or location.

31. The computer program product of claim 30, further comprising non-transitory computer readable program code for adjusting the timing of play of said at least one entertainment content to provide seamless play while maintaining synchronization.

32. The computer program product of claim 19, further comprising non-transitory computer readable program code for detecting gaps in said at least one story path during the provision of said at least one entertainment content.

33. The computer program product of claim 32, further comprising non-transitory computer readable program code for providing filler or conditional content where a gap has been detected.

34. The computer program product of claim 19, further comprising non-transitory computer readable program code for:
prioritizing said at least one predetermined trigger point; and
maintaining story synchronization.

35. The computer program product of claim 19, further comprising computer non-transitory readable program code for calculating whether synchronization is maintained as a result of play of said at least one entertainment content based on said at least one trigger point.

36. A computer program product comprising a computer usable medium having control logic stored therein for causing a computer processor to generate GPS-enabled entertainment, said control logic comprising:
non-transitory computer readable program code for determining a user's GPS location, wherein said user is travelling in a vehicle;
non-transitory computer readable program code for loading at least one story path having at least one predetermined trigger point, each said at least one predetermined trigger point being embedded within said at least one story path and wherein each said at least one predetermined trigger point is set up to trigger play of at least one entertainment content while said vehicle travels along said story path;
non-transitory computer readable program code for comparing said user's GPS location with said at least one story path;
non-transitory computer readable program code for providing said user with said at least one entertainment content based on said at least one pre-determined trigger point;

non-transitory computer readable program code for providing interactive activity or effects consistent with said at least one story path, said at least one entertainment content and at least one current travel condition of said user's vehicle; and non-transitory computer readable program code for prioritizing said at least one trigger point to determine which said at least one trigger point are to be triggered to ensure that critical elements of said at least one entertainment content are played while maintaining synchronization with said user's travel route.

\* \* \* \* \*